United States Patent Office 2,782,658
Patented Feb. 26, 1957

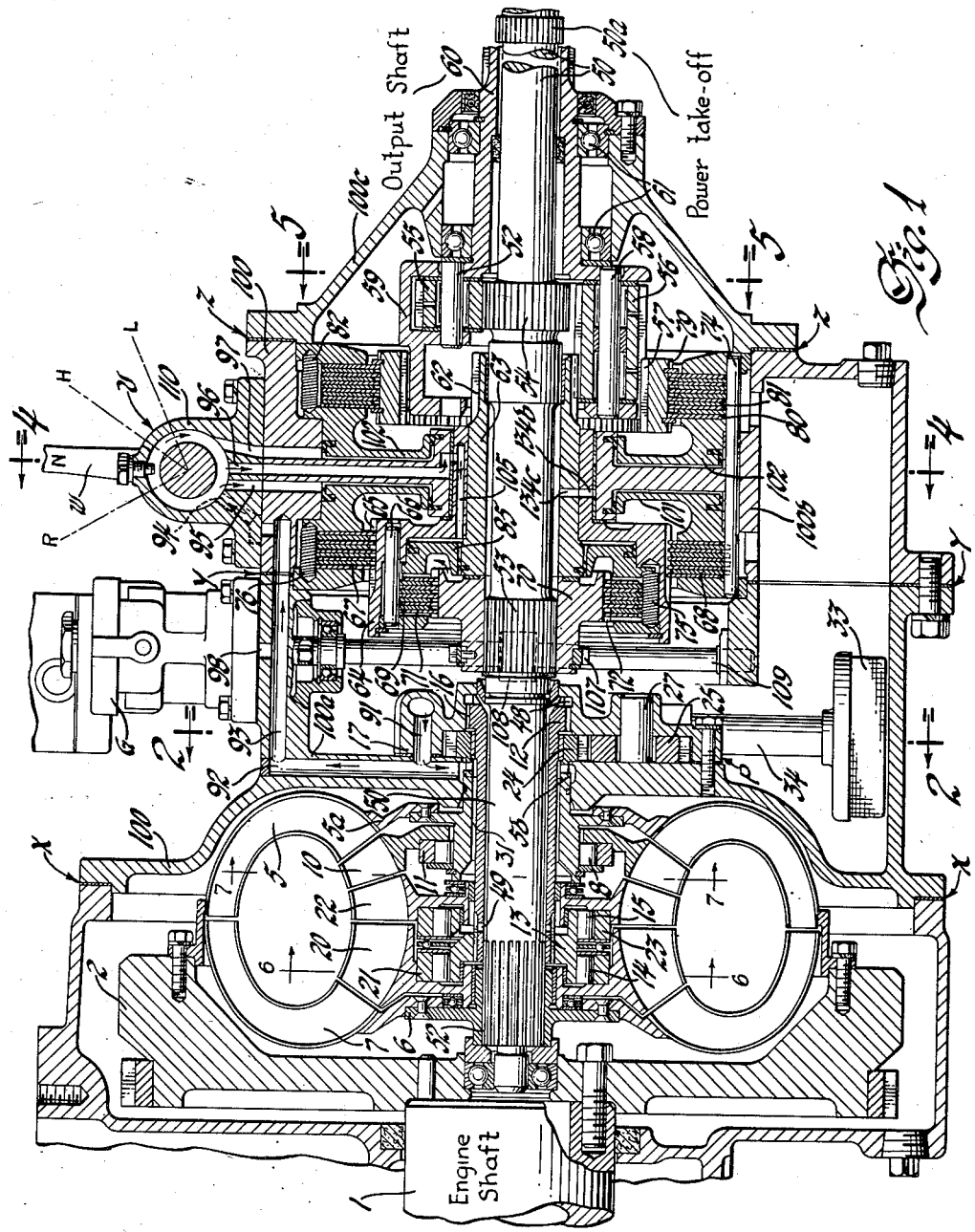

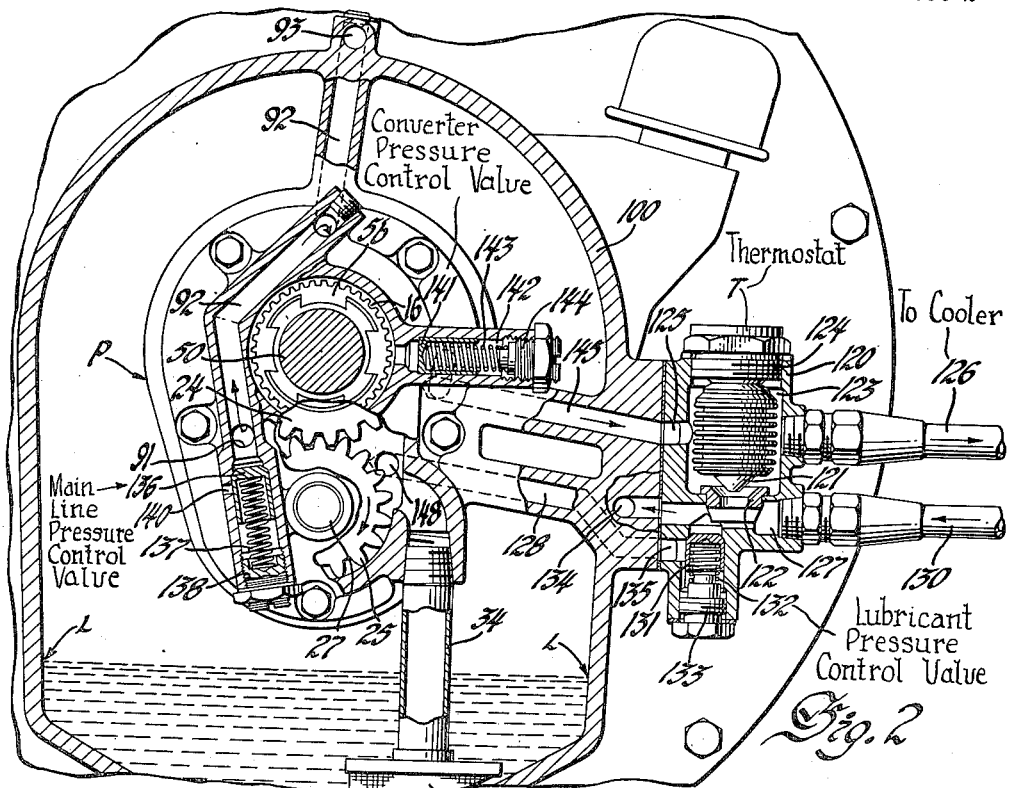
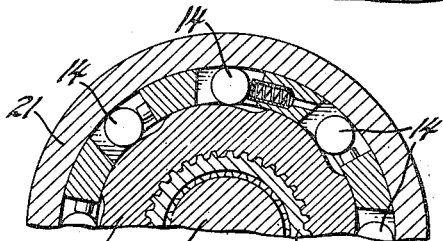
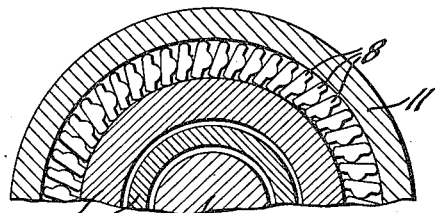
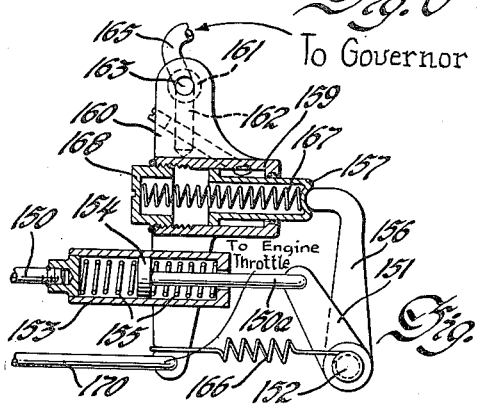
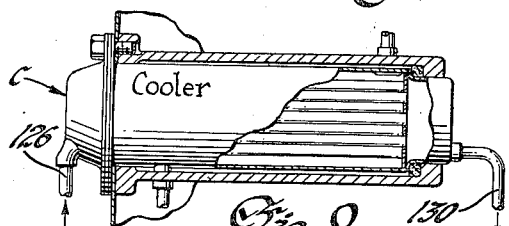

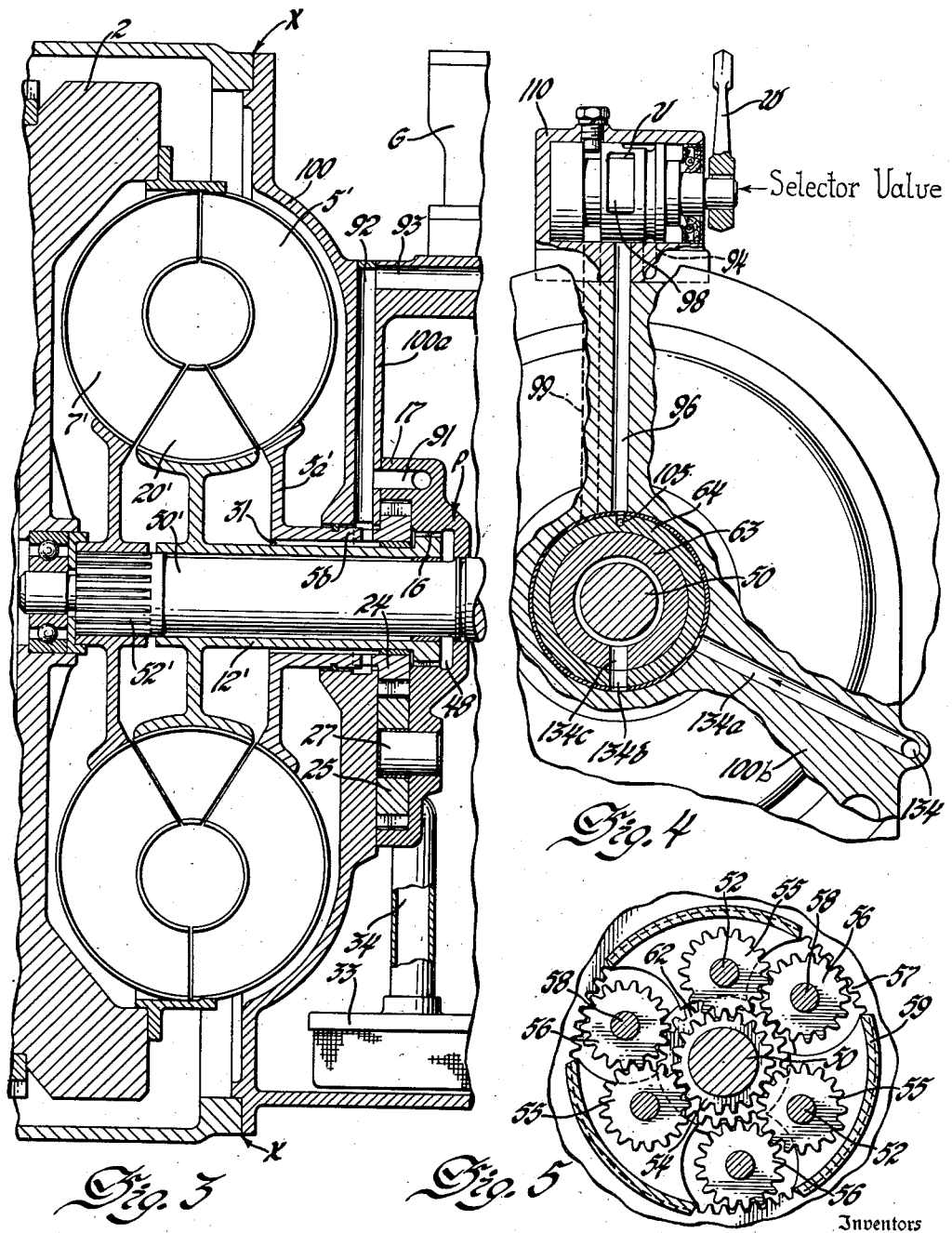

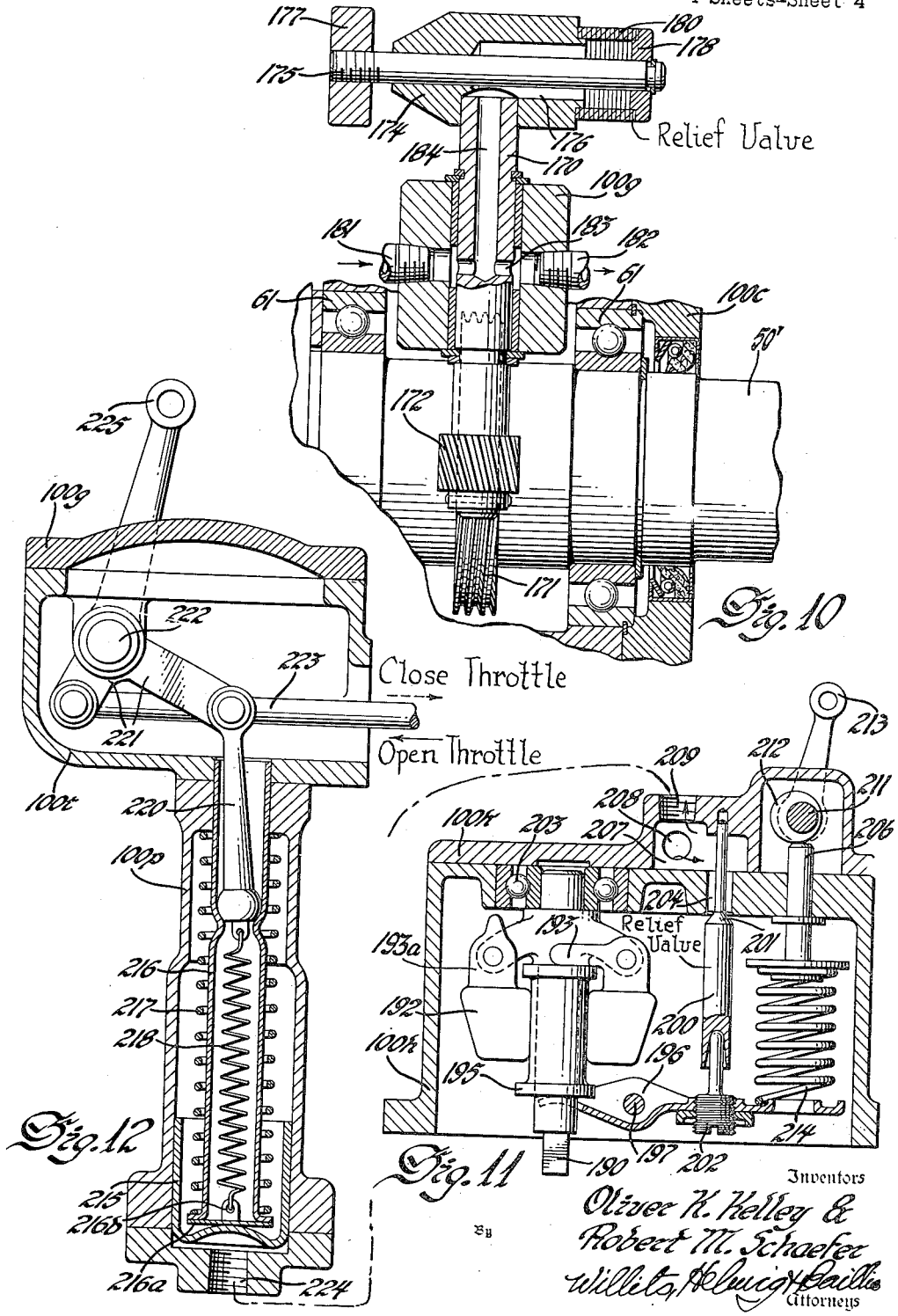

2,782,658

COMPOSITE FLUID AND GEAR DRIVE

Robert M. Schaefer, Indianapolis, Ind., and Oliver K. Kelley, Birmingham, Mich., assignors to General Motors Corporation, Detroit, Mich., a corporation of Delaware Application January 18, 1951, Serial No. 206,602

10 Claims. (Cl. 74—645)

This invention relates to composite hydraulic and gear transmissions for vehicles. While the invention is of general application it is particularly adapted to the driving of heavy duty vehicles such as tractors and earth-moving machinery.

It is an object of the invention to provide an improved transmission in which a hydrokinetic torque converter is combined in series with change-speed gearing and in which a single hydraulic system initiates and furnishes the power for all control functions as well as supplying lubrication for the entire apparatus. More specifically it is one object of the invention to provide a governor which is responsive to the vehicle speed for controlling the engine so as to maintain a constant vehicle speed under widely varying resistance to motion of the vehicle and to provide a constant speed control at any desired speed setting.

Another object of the invention is to provide a transmission having two outputs, one of which can be driven at a substantially constant speed regardless of changes in load, and the other of which can have its speed ratio changed independently of the speed of the first output.

Further objects and advantages appear in the following specification description covering the appended drawings in which:

Figure 1 is a vertical elevation of a transmission embodying the present invention, showing a multi-stage fluid torque converter driven by the shaft of an engine or power plant, and driving a change-speed gear unit coupled to a load shaft.

Figure 2 is a sectional view taken at 2—2 of Figure 1 to show portions of the fluid pressure system.

Figure 3 is a partial view like Figure 1, of a modification having a single-stage torque converter ahead of the change-speed gear box.

Figure 4 is a part section taken at 4—4 of Figure 1 to show certain of the fluid pressure portions.

Figure 5 is a section at 5—5 of Figure 1 to demonstrate the meshing of the change-speed gear elements.

Figure 6 shows a section of a form of one-way clutch usable for preventing backward rotation of one or both of the reaction rotors of the fluid torque converter, being taken on the line 6—6 of Figure 1.

Figure 7 is a similar view of another form of one-way clutch usable in the same way as that of Figure 6, but described below as coupling the impellers of the multi-stage fluid torque converter, being taken on the line 7—7 of Figure 1.

Figure 8 is a schematic view in part-section of a control linkage devised to provide automatic engine throttle adjustment to output load.

Figure 9 is a view of a heat-exchanger, sectioned to show the flow of the fluids utilized, in connection with the flow passages of Figure 2.

Figure 10 is a form of hydraulic governor adapted to be connected with the mechanism of Figure 8, the essential parts being sectioned to show the fluid passages.

Figure 11 is a section of a modified form of governor.

Figure 12 is a modified form of throttle control apparatus being alternative to Figure 8.

The torque converter

Referring to Fig. 1: Engine shaft 1 carries flywheel 2 supporting the torque converter main impeller 5 fastened to a hub 5a which has clutch teeth 5b at its right end for connection to a pump P as will be explained. The turbine 7 is mounted on hub 6 splined at 52 to intermediate drive shaft 50. The hub of the main impeller 5 is connected to an auxiliary impeller 10 through a one-way clutch so arranged that the auxiliary impeller cannot rotate slower than the main impeller (Fig. 7). The clutch has an outer race 11 connected to the auxiliary impeller, sprags 8, and an inner race 11a connected to the main impeller.

Two reaction rotors 20 and 22 are prevented from reverse rotation but permitted to rotate forwardly by one-way brakes having outer races 21 and 23 respectively on rollers 14 and 15 respectively on a common cam plate or inner race 13 (see Fig. 6) keyed to the left end of stationary sleeve 12, the right end of which is keyed at 16 to the pump body 17 which is bolted to the casing.

The pump P previously referred to consists of meshed gears, the gear 24 turning freely on sleeve 12 and being connected to the impeller by teeth meshing with clutch 5b on the impeller hub. Gear 25 rotates on shaft 27 fixed in pump body 17.

The intermediate drive shaft extends to the right to an auxiliary power take off 50a, is splined about midway of its length at 53 to receive a clutch hub 70, being also formed near its right end into a sun gear 54, forming part of the change-speed gear unit. Sun 54 meshes with short planet pinions 55 turning on spindles 52 in a carrier 59 and meshing with long pinions 56 turning on spindles 58 in the same carrier. The long pinions also mesh both with a reversing reaction ring gear 57 (through suitable apertures in the carrier) and with a second sun gear 62 which can either be braked to ground for low speed drive or to be driven to establish direct or high speed drive. The carrier is the output element, and is formed as part of final drive or output shaft 60.

The second sun gear 62 formed on sleeve 63 attached to a clutch drum 64, having pins 65 supporting clutch plates 69 which mate with plates 71 are splined to clutch hub 70. The clutch drum 64 has a piston 85 which can be urged to the left, as will be explained, to engage plates 69—71 to connect sleeve 63 (and hence sun gear 62) to the intermediate drive shaft 52. This drives the two suns 62 and 54 and locks up the planetary gear unit to drive output shaft 60 at turbine speed. The clutch plates 69—71 may be disengaged by release springs 75.

The clutch drum 64 also forms a brake hub for locking the sun 62 to the casing to act as a reaction gear effecting low speed drive of output shaft 60. For this purpose the drum 64 has splines 66 on its outside carrying brake plates 67 mating with stationary brake plates 68 carried on pins 74 in the casing. The brake is set by a piston 101 which may be urged to the left by hydraulic pressure and is released by springs 76.

The annulus gear 57 may be held to provide reverse drive by a brake including plates 80 splined at 79 to the gear 57 and mating with stationary plates 81 splined to the housing by pins 74. This reverse brake is set by hydraulic piston 102 and released by springs 82.

The casing 100 is preferably in four parts separable at the parting planes x—x, y—y, and z—z. The left hand portion is a fly-wheel housing which together with the hub 100a of the second portion forms a casing for the torque converter. The third portion includes the cylinders containing the clutch and brake pistons and the fourth or right portion is a support for the bearings 61 of the output shaft 60.

Hydraulic system

The clutch and brake pistons 85, 101, 102 are operated by oil under pressure delivered through conduits in the casing 96, 95, 97 respectively (Fig. 1) leading from a rotatable selector valve V which receives oil from passage 94 (Figs. 1, 4) connected to pump delivery passage 91 (Figs. 1, 4) by passages 92, 93. The valve may be operated by handle W, and has four positions designated R, N, H, L in Fig. 1 indicating reverse drive, neutral, high or direct drive and low drive respectively. When the valve is in any one of the drive positions, the appropriate clutch or brake is actuated by oil delivered to the appropriate passage 95, 96, 97 while exhaust passage 98 of the valve (Fig. 4) connects the other two passages of 95, 96, 97 to conduit 99 leading to the sump through low pressure lubrication passages 134a, 134b and 134c. For example, piston 85 is operated by oil through axial passage 105, connected to radial passage 96 (Figs. 1 and 4). In neutral no clutch or brake is supplied.

The pump gears 24, 25 rotate as shown by the arrows in Fig. 2 and draw in oil from the sump through strainer 33 and intake pipe 34, delivering oil to the outlet passage 91. As seen in Fig. 1 the pump also supplies the torque converter the oil flowing from outlet passage 91 to the space at the right of impeller hub 5a, thence into the torque converter along the annular passage 31 between the hub and sleeve 12. Oil returns from the torque converter through passage 49 in sleeve 12 and between sleeve 12 and shaft 50 through space 48 (the pressure in which is controlled by the converter pressure control valve 141, as will be explained) and so back to the intake of the pump.

Temperature and pressure control

The hydraulic system maintains three levels of pressure by three pressure responsive valve shown in Fig. 2. The main line pressure is regulated by the relief valve 136 which is urged closed by a spring 137 the force of which is adjusted by screw cap 138. When the pressure exceeds the predetermined value, the valve 136 by-passes oil through opening 140 to the sump. The converter pressure regulating valve 141 (Fig. 2) receives oil from space 48 (Fig. 1) where it has flowed from sleeve 12 and from the converter. When the converter pressure exceeds a predetermined amount the relief valve 141 opens against the force of spring 143 (adjusted by screw cap 144) and delivers oil to the passage 145 leading to the temperature control T. If the oil is cool, the thermostat valve 121 is open and oil from the converter flows to passages 127 and 134, the latter leading to lubricating passages 134a, 134b, 134c (Fig. 4) which lubricate the gearset. When pressure in the lubricating passages exceeds a predetermined amount, relief valve 131 opens against spring 132 (adjusted by screw cap 133) to by-pass oil to passages 135 and 128 leading to port 148 in the intake of the pump P.

Whenever the temperature of the oil flowing from the converter is above a predetermined amount, the temperature responsive element moves valve 121 toward the seat 122, restricting or preventing flow, as the case may be, to passage 127 and directing part or all of the oil through pipe 126 to cooler C (Fig. 9) from which it returns to space 127 for supply to the lubricating passages under control of pressure relief valve 131.

Modified torque converter

A modified form of torque converter is shown in Fig. 3, in which primed reference characters refer to the modified structures of those parts designated by the same respective characters not primed. Otherwise the parts are as previouly described. This torque converter has impeller 5' and impeller hub 5a' clutched by teeth 5b to pump gear 24. Turbine 7' is keyed at 52 to intermediate drive shaft 52'. The single reaction member 20' is permanently fixed to sleeve 12' keyed to the frame at 16. Oil is supplied to the converter from pump delivery passage 91 by passage 31 and drain from the converter returns to the pump through passage 48.

Governor

In Fig. 1 G represents any suitable governor for maintaining substantially constant vehicle speed, regardless of changes of resistance. The governor receives oil from the main line 93 through passage 98 and delivers oil at reduced pressure to the passage 165 in Fig. 8. The reduced pressure is a function of governor speed of rotation, hence vehicle speed, and preferably is proportional to speed. A suitable governor is shown in Fig. 2 of the Thompson U. S. Patent 2,204,872. The governor (see Fig. 1 herein) is driven by a shaft 109 geared to drive gear 107 keyed to clutch hub 70 and hence driven by intermediate shaft 50. The governor could be driven by output shaft 60. Fig. 8 shows one form of apparatus by which the governor moves the throttle to control engine speed. A hand operated, positively positioned rod 150, is connected to one arm 151 of a bell crank lever 151—152—156 through a resilient connection including a cylinder 153 attached to the rod 150 and a piston held between opposing springs 155 and connected by rod 150 with lever arm 151. The lever turns on stationary pivot 152 and its other end 156 engages spring-pressed plunger 157 which forms part of swinging arm 160 mounted on stationary pivot 161 and connected at its free end with a rod 170, which when moved to the left in Fig. 8 opens the engine throttle against the closing force of spring 166. Rod 170 can be fixed in any position. Plunger 157 is urged out of the cylinder 159 of arm 160 by spring 167, the force of which is regulated by screw plug 168. The plunger is urged into the cylinder by pressure of governor oil supplied to the cylinder through conduit 165, passage 163 in pivot 161 and duct 162. When the hand rod 150 is fixed the position of lever arm 156 is fixed, subject only to the movement permitted by springs 155. Springs 166 and 167 hold plunger 157 fixed against arm 156. Increasing governor pressure (indicating increasing vehicle speed) moves cylinder 159 and arm 160 to the right against the spring 167, moving the throttle toward closed position. Conversely low governor pressure permits spring 167 to push arm 160 to the left to open the throttle more. This tends to maintain a constant vehicle speed, the ratio of the transmission changing automatically in the torque converter as the resistance in the vehicle may require in any setting of the planetary gearset.

Fig. 10 shows an alternative form of governor, illustrated in connection with the alternative form of torque converter of Fig. 3, but equally applicable to either torque converter. Governor shaft 170 is rotated at a speed proportional to the speed of the vehicle by gear 172 meshing with worm 171 driven by shaft 50'. The shaft is mounted in governor body 100g having an oil inlet 181 connected to the pump P and an oil outlet 182 leading to passage 165 of the throttle control in Fig. 8. Communication between 181 and 182 is through perforations 183 in the governor shaft. The pressure in 182 is controlled by a relief passage 184—186. A weight 177 on rod 175 is urged out by centrifugal force and urged in by the compression spring 180 acting on washer 178, the spring also serving as a relief valve. When the weight is in, at low speed, the spring is expanded so that its convolutions are far apart, leaking much oil and reducing the pressure in 182. When the weight is out, at high speed, the convolutions are close together and less oil is leaked, increasing the pressure.

Fig. 11 shows still another modified form of governor and pressure control. A governor drive shaft 109 is suitably connected to shaft 50, 50' or 60 and rotates in bearings 203 in housing 100h. The shaft carries flyweights 192 having arms 193 which urge downward sleeve 195 against the force of lever 196, pivoted at 197 and urged clockwise by restoring spring 214 held by adjustable abutment 206. The lever 196 carries an adjustable valve tappet 202 which, when the lever is moved counterclockwise by the fly-weights on increasing speed, tends to close relief valve 201 against the pressure of oil in relief passage 204 communicating with chamber 207 which is supplied by oil from pump P at passage 208 and which delivers oil at regulated pressure through opening 209 either to passage 165 in Fig. 8 or to the alternative throttle control of Fig. 12 to be described. Increasing vehicle speed tends to close the relief valve 201 to increase governor pressure to close the throttle, and conversely reduced speed reduces pressure to open the throttle. The force of restoring spring 214 can be regulated by cam 212 on shaft 211 rocked by arm 213 which is hand controlled. This can modify governor response, and even open the throttle wide.

Fig. 12 shows an alternative throttle control mechanism which can be used instead of the one in Fig. 8. In Fig. 12 the rod 223 corresponds to the rod 170 of Fig. 8. The rod is actuated by a bell-crank lever 221 pivoted at 222. One arm of the bell crank is pivoted to rod 220 which can be pushed up (to close the throttle) by a constriction in casing 216 and can be pulled down (to open the throttle) by spring 218 attached to ear 216b on plate 216a which is attached to the bottom of the sleeve 216 and is urged down by spring 217. The casing 216 (and with it rod 220) is pushed up by piston 215 when the piston is moved upward by pressure of oil in passage 224 which may be connected to the governor output for example 182 in Fig. 9 or 209 in Fig. 10. As in the other form, increasing governor pressure with increasing vehicle speed tends to close the throttle by pushing up on piston 215, casing 216 and rod 220 to rotate the bell crank counterclockwise to push rod 223 to the right. Rod 223 can also be actuated in either direction by handle 225 on shaft 222.

In Figure 1, it will be noted that shaft 50 is extended outwardly beyond drive shaft 60 to provide for auxiliary power take-off. By this arrangement for power take-off, the splined portion 50a on shaft 50 is caused to rotate independently of the selection of transmission gear ratio through actuation of valve V, and is operable even when the power output shaft 60 is inoperative, as for example, when the transmission is placed in neutral. Thus, the power take-off drive is a constant, while the transmission propulsion drive clutches may be engaged and disengaged at will by means of selector valve V. For example, a tractor equipped with the transmission disclosed can pull a vehicle while driving accessory equipment, and can operate the accessories at a constant speed at varying torque whether the vehicle is moving or not. Also, the speed of the vehicle may be changed without changing the speed of the accessories.

We claim:

1. In fluid pressure supply systems for power transmissions, the combination of an engine and of a pump driven by the said engine, a transmission assembly adapted to drive a load shaft and driven by said engine, the said assembly including a fluid torque converter, step ratio drive means embodied in said assembly and connected to be driven by the said converter, fluid pressure actuation means for said step ratio drive means, a fluid pressure working space in the said converter, supply passages connecting the said pump to the said actuating means including a distributing valve, lubrication passages adapted to deliver oil under pressure from said valve to the running parts of the said assembly, an over-pressure relief valve connected directly to the output of said pump, a pressure regulator valve connected to the output of said pump, heat exchanger means for cooling the oil body of said assembly, a delivery passage connecting the output of said regulator valve to the said heat exchanger, said passage including a valve responsive to the temperature of the said oil body, a return passage from said heat exchanger leading to the suction intake of said pump and to the lubrication passages of said assembly, a bypass valve adapted to prevent flow to the suction side of said pump when the pressure of the oil coming from said cooler is below a given value, and an arrangement of the passages connecting the delivery of said pump to the said actuators such that fluid pressure being relieved by the said valve from the said actuators is exhausted to the said lubrication passages.

2. In power devices for vehicles, the combination of an engine, a throttle for said engine, a fluid torque converter driven by said engine and driving an intermediate shaft, a change speed gearing unit driven by said intermediate shaft and driving a load shaft, a governor unit adapted to deliver a variable hydraulic pressure driven by said intermediate shaft, manually operable means operatively associated with said governor unit for selecting the engine throttle setting, a hydraulically actuated servo unit operatively connected to said governor for actuating said engine throttle, and manual means associated with said servo unit for over-ruling said governor action.

3. In power drives for continuous torque operation of vehicles, the combination of an engine, an engine throttle, a torque converter coupled to said engine and adapted to deliver infinitely variable torque to an intermediate shaft, a step-ratio gear unit driven by said shaft and adapted to provide a plurality of ranges of speed ratio to a load shaft driven by said gear unit, actuation and control means for said step-ratio gear unit operative to establish changes of ratio drive to said load shaft while continuing to deliver torque between said shafts, a governor driven by one of said shafts adapted to deliver a variable hydraulic pressure, a servo unit responsive to fluid pressure delivered by said governor for controlling said engine throttle, and manually operable means for varying the action of said governor.

4. In power drive devices for continuous torque operation of vehicles, the combination of an engine, an engine throttle, a torque converter coupled to said engine and adapted to deliver infinitely variable torque to an intermediate shaft, a step-ratio gear unit driven by said shaft and adapted to drive a load shaft at a plurality of speed ratios, actuation and control means for said step-ratio gear unit operative to establish changes of ratio drive to said load shaft while continuing to deliver torque between said shafts, a governor driven by the output member of said torque converter for delivering a variable hydraulic pressure increasing with increase in speed of rotation of said torque converter output member, and a servo unit connected to said engine throttle and hydraulically connected to said governor for controlling said throttle, said servo unit being effective to reduce the engine throttle opening upon an increase in the pressure level of hydraulic pressure delivered by said governor.

5. In the combination set forth in claim 4, manually operable means for varying the pressure level of fluid pressure delivered by said governor.

6. In the combination set forth in claim 4, manually operable means for varying the pressure level of fluid pressure delivered by said governor, and a manual overcontrol operatively associated with said servo unit for over-controlling governor control of the engine throttle.

7. In power drives for continuous torque operation of vehicles, the combination of an engine, an engine throttle, a torque converter coupled to said engine and adapted to deliver infinitely variable torque to an intermediate shaft, a step-ratio gear unit driven by said shaft and adapted to provide a plurality of ranges of drive ratio to a load shaft driven by said gear, actuation and control means for said step-ratio gear units operative to establish changes of drive ratio to said load shaft while continuing to deliver torque between said shafts, a governor driven proportional to engine speed adapted to deliver a variable hydraulic pressure, a servo unit responsive to fluid pressure delivered by said governor for controlling said engine throttle, and manually operable means for varying the action of said governor.

8. In power drive devices for continuous torque operation of vehicles, the combination of an engine, an engine throttle, a torque converter coupled to said engine and adapted to deliver infinitely variable torque to an intermediate shaft, a step-ratio gear unit driven by said shaft and adapted to provide a plurality of ranges of drive ratio to a load shaft driven by said gear unit, actuation and control means for said step-ratio gear unit operative to establish changes of drive ratio to said load shaft while continuing to deliver torque between said shafts, a governor driven proportional to engine speed for delivering a variable hydraulic pressure increasing with increase in speed of rotation of said governor, and a servo unit connected to said engine throttle and hydraulically connected to said governor for controlling said throttle, said servo being effective to reduce the engine throttle opening upon an increase in the pressure level of hydraulic pressure delivered by said governor.

9. In a power drive mechanism comprising a power plant driving a torque converter, a shaft driven by said torque converter and driving a gearing unit coupled to a load shaft, the combination of a throttle for the power plant, a fluid pressure source, a governor connected to said source and adapted to vary the pressure supplied thereto in accordance with changes in speed of rotation of said converter driven shaft, a servo member connected to said governor and said throttle effective to control the position of said throttle to maintain a substantially constant speed of rotation of said load shaft irrespective of variations in load applied to said load shaft, means for manually selecting the position of said throttle to select a predetermined speed of rotation of said converter driven shaft, and additional manually operable means for varying the position of said throttle without disturbing the setting of said first-mentioned means for manually selecting the position of said throttle.

10. In a power drive mechanism comprising an engine driving a torque converter, a shaft driven by said torque converter and driving a gearing unit coupled to a load shaft, the combination of a throttle for said power plant, a pump, a governor connected to said pump and adapted to vary the pressure supplied thereto in accordance with changes in speed of rotation of said converter driven shaft, a servo member connected to said governor and said throttle effective to control the position of said throttle to maintain a substantially constant speed of rotation of said converter driven shaft irrespective of variations in the load applied to said load shaft, manually operable means associated with said governor for initially selecting the position of said throttle to select a given speed of rotation of said converter driven shaft, and additional manually operable means associated with said servo member for varying the position of said throttle without disturbing the setting of said first-mentioned means for selecting the position of said throttle.

References Cited in the file of this patent

UNITED STATES PATENTS

| | | |
|---|---|---|
| 1,307,230 | Von Zweigbergk | June 17, 1917 |
| 1,619,701 | Chorlton | Mar. 1, 1927 |
| 1,619,703 | Chorlton | Mar. 1, 1927 |
| 1,993,983 | Woodard | Mar. 12, 1935 |
| 2,144,270 | Palmgren | Jan. 17, 1939 |
| 2,204,872 | Thompson | June 18, 1940 |
| 2,413,675 | Baker | Jan. 7, 1947 |
| 2,499,128 | Brunken | Feb. 28, 1950 |
| 2,506,671 | Jacobi | May 9, 1950 |
| 2,523,783 | Schjolin | Sept. 26, 1950 |
| 2,525,653 | Darnell | Oct. 10, 1950 |
| 2,606,459 | Carnegie | Aug. 12, 1952 |

FOREIGN PATENTS

| | | |
|---|---|---|
| 375,254 | Italy | Sept. 29, 1939 |
| 867,896 | France | Sept. 8, 1941 |

OTHER REFERENCES

Automotive Industries, pp. 40–45, January 1, 1950.